United States Patent [19]

Ulbers et al.

[11] Patent Number: 4,806,777

[45] Date of Patent: Feb. 21, 1989

[54] DEVICE FOR SCANNING THE CONTOUR OF A SURFACE OF A WORKPIECE

[75] Inventors: Gerd Ulbers, Weilerbach; Karl Hutter, Muhlhausen, both of Fed. Rep. of Germany

[73] Assignee: Hommelwerke GmbH, Schwenningen, Fed. Rep. of Germany

[21] Appl. No.: 119,975

[22] Filed: Nov. 13, 1987

[30] Foreign Application Priority Data

Dec. 19, 1986 [DE] Fed. Rep. of Germany ....... 3643500
Jun. 11, 1987 [DE] Fed. Rep. of Germany ....... 3719422

[51] Int. Cl.$^4$ .............................................. G01V 9/04
[52] U.S. Cl. ...................... 250/560; 356/376
[58] Field of Search ............... 250/560, 561; 356/376, 356/381, 4; 33/125 A, 125 M, 125 R

[56] References Cited

U.S. PATENT DOCUMENTS

| | | | |
|---|---|---|---|
| 4,373,804 | 2/1983 | Pryor et al. | 356/376 |
| 4,629,324 | 12/1986 | Stern | 356/376 |
| 4,657,393 | 4/1987 | Stern | 356/376 |
| 4,674,869 | 6/1987 | Pryor et al. | 356/376 |
| 4,721,388 | 1/1988 | Takagi et al. | 356/376 |
| 4,748,335 | 5/1988 | Lindlow | 356/376 |

Primary Examiner—David C. Nelms
Assistant Examiner—Jessie Ruoff
Attorney, Agent, or Firm—Allegretti & Witcoff, Ltd.

[57] ABSTRACT

Device for the contact-free measurement of a distance from a surface, particularly for scanning the contour of a surface of a workpiece along a given measuring path, comprising a measuring body enclosing optoelectronic means for transmitting light to the surface to be measured and converting the light reflected by such surface into an electrical signal as a function of the distance from the surface. The measuring body is supported on a stand and is movable in the direction of measurement. The optoelectronic means comprise a focus position measuring system and an optoelectronic position scanning unit for scanning the position of the measuring body relative to the supporting stand. An adder connected to indicating or recording means adds the output signal of the focus position measuring system to the output signal of the position scanning unit to produce a summation signal which corresponds to the distance of the measuring body from the surface being measured at any selected point of movement of the measuring body on the supporting stand. Thus, the measured value is additively formed of two partial values, of which the partial value derived from the focus position measuring system is obtained without sluggishness, while the other partial value permits the measurement of a coarse profile.

9 Claims, 3 Drawing Sheets

DEVICE FOR SCANNING THE CONTOUR OF A SURFACE OF A WORKPIECE

The present invention relates to a device for the contactless measurement of a distance from a surface, particularly for scanning the contour of a surface of a workpiece.

PRIOR ART

It is known from the brochure ET-30 of Kosaka Laboratory Ltd. to measure the distance of a surface from an optoelectronic measuring head with the aid of a focus position measuring system disposed within the measuring head. The measuring head is moved parallel to the surface area being measured and the output signal of the focus position measuring system is graphically recorded. The structural details of this kind of focus position measuring system are described in the periodical "Laser Magazin", Vol. 4/85, p. 75, where it is cited in connection with the scanning of optical records. The focus position measuring system of the aforementioned Kosaka brochure has a measuring range of maximal 2 $\mu$m. This measuring range is frequently not sufficient if the extent of roughness of the surface is to be traced by moving the measuring head parallel to the surface because the roughness frequently is greater than 2 $\mu$m. While this focus position measuring system as such is well suited for making roughness measurements, the problem that arises in practice is that at any given configuration of the surface of a workpiece to be scanned, the measured value will very quickly exceed the measuring range of the system and thus preclude taking conclusive measurements unless adjustments of a rather complicated nature are performed.

The article "Quantative Micro-Surface Measurement Systems" published by WYKO Corporation, 2990 E. Fort Lowell, Tucson, Ariz., USA, describes a measuring system for determining the profile of a surface. This system comprises essentially an interferometer by which light is focussed onto the surface to be measured and the reflected light is compared with the light which is reflected by a fixed reference surface. Thereupon the interference is measured between the light reflected by the surface being measured and the light reflected by the reference surface. This type of profile measuring instrument also has a very small measuring range and the evaluation of the measuring signal is complex and elaborate.

It is the object of the present invention to provide a device for the contactless measuring of a distance from a surface, which device possesses the precision of a focus position measuring system coupled, however, with a larger measuring range so that simultaneously measurements can be performed with a high degree of accuracy to determine the roughness of a surface and to measure the coarse profile of the surface.

THE INVENTION

The basic concept of the present invention includes the use of a precision focus position measuring system for measuring the roughness of a surface area and to compensate for the disadvantages of such a system due to its narrow measuring range, provides for the measuring body to be supported on a stand so as to be movable in the direction of measurement whereby the measuring body is moved in such a manner that the focus position measuring system will always stay within its measuring range. This is accomplished by optoelectronic position scanning means, preferably an interferometer, which functions to determine any position of movement, or slidable displacement of the measuring body relative to the stand by which it is supported. By adding the length values represented by the output signals of the focus position measuring system to those of the interferometer, the absolute distance of the surface being measured from the measuring body is obtained and processed for indication or display and recording.

The measuring body may comprise a slidably mounted casing. However, a preferred embodiment of the invention consists of a measuring body formed by the end portion of a two-armed lever, centrally pivoted, the end portion carrying the focus position measuring system. By affixing the focus position measuring system directly to the end portion of the lever acting as a scanner, additional optical means such as mirrors, lenses or the like will become superfluous, this being a further advantage as such additional equipment would considerably increase the sluggishness of the scanner.

It is possible to make the adjustment of the measuring body relative to the supporting stand by hand. However, it is preferred to perform such adjustment with the aid of drive means controlled by a signal from the focus position measuring system so that the focus position measuring system will never exceed its measuring range. It is also possible to adjust the controls in such a manner that the output signal of the focus position measuring system always has a certain value, in particular zero.

An embodiment of the automatic adjustment of the measuring body includes a servomotor controlled by the output signal of the focus position measuring device so that the measured value of the focus position measuring system is diminished, meaning that it will always be inside the extent of its measuring range.

In another embodiment of the invention an oscillating drive is provided to move the measuring body to-and-fro in the direction of measurement so that it will always cover part of its measuring range. The control of the drive for the measuring body may be effected in various ways, one being that the adjustment is made in a manner such that the measured value of the focus position measuring system will always oscillate about zero. It is also possible, however, to use any other selected value of the output signal of the focus position measuring system as a criterion for the summation signal derived from the output signals of the focus position measuring system and the interferometer to be activated for indication/display or recording purposes. The oscillating or swing drive for the measuring body may be constructed, for example, like th voice coil of a dynamic loudspeaker.

THE DRAWINGS

The invention will be further described with reference to an exemplary embodiment illustrated in the drawings, in which.

Figure 1:
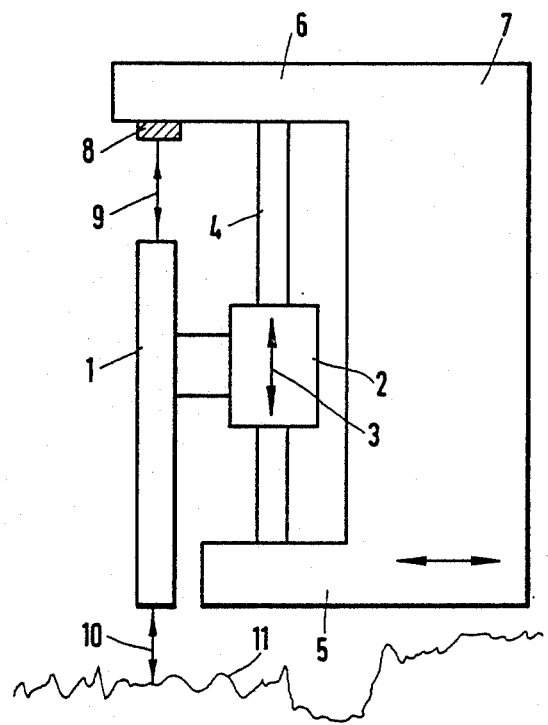
FIG. 1 illustrates diagrammatically an embodiment of the inventive device for scanning the surface profile of a workpiece.

The embodiment of the invention shown in FIG. 1 comprises a measuring body 1 secured to guide means 2 supported on a pole-shaped stand 4 for sliding movement in the direction of the double arrow 3. The pole-shaped supporting stand 4 is joined at top and bottom to extensions 5 and 6 of a support frame 7.

Disposed at the extension 6 of the frame 7 is a mirror 8 for reflecting a light beam 9 emerging from the measuring body 1 in an upward direction back into the measuring body 1. In the downward direction, the light beam 10 emerging from the measuring body 1 is directed onto a surface 11 of a workpiece to be measured and is reflected by the surface 11 back to the measuring body 1. The light beam 9 comes from an interferometer 14 enclosed in the measuring body 1, and the light beam 10 is emitted by a focus position measuring system also enclosed in the measuring body 1.

Figure 2:
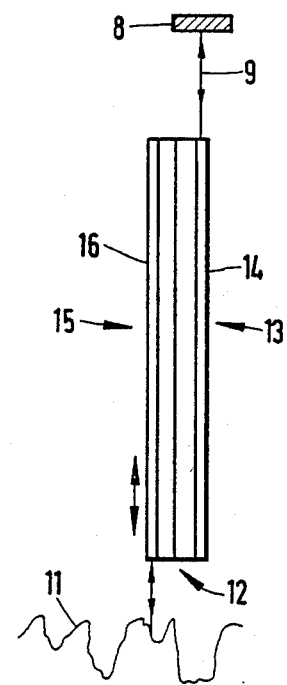
FIG. 2 is a side view of the optoelectronic means enclosed in the measuring body of FIG. 1.
Figure 3:
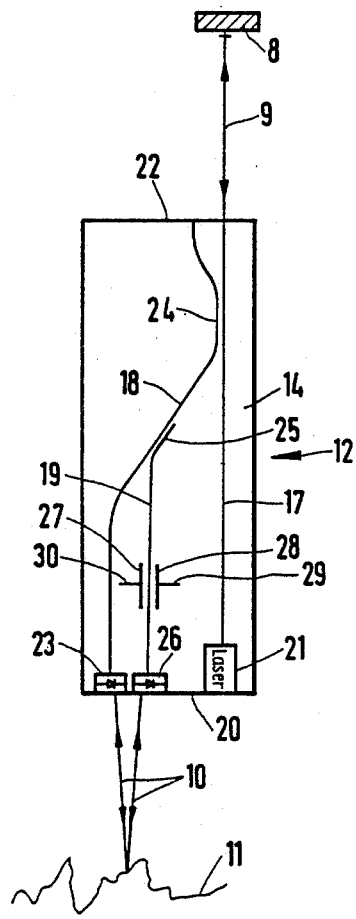
FIG. 3 is a side view of the optoelectronic means of FIG. 2 that has an interferometer attached thereto.
Figure 4:
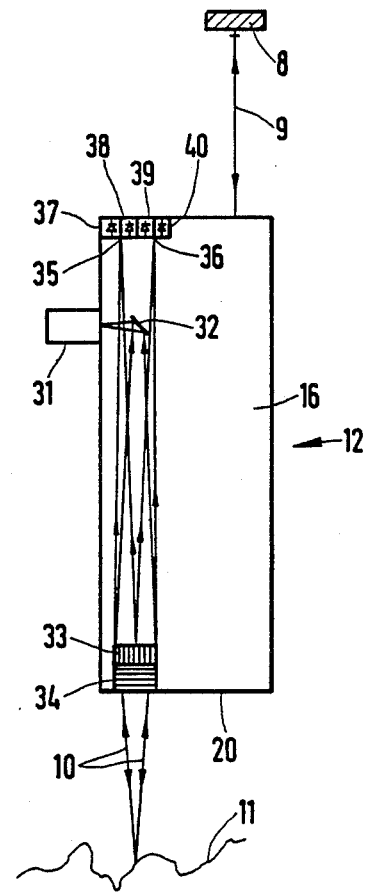
FIG. 4 shows the other side of the optoelectronic means of FIG. 2 having a focus position measuring system attached thereto.

FIG. 2 shows optoelectronic means enclosed in the measuring body 1 consisting substantially of a base. One surface 13 of the base is provided with an interferometer 14 and the other surface 15 is provided with a focus position measuring system 16. Emerging from the interferometer 14 in an upward direction is a beam of light 9 mentioned previously in connection with FIG. 1, the light beam 9 impinging upon mirror 8. Emerging from the focus position measuring system 16 is the beam of light 10, also previously mentioned in connection with FIG. 1. For completeness, the surface area 11 of a workpiece being measured is also shown. The structural details of the interferometer 14 are shown in FIG. 3, and the basic structure of the focus position measuring system is shown in FIG. 4. Each of these two figures also indicate the surfaces 13 and 15 in a slightly enlarged scale.

In FIG. 3, the light conducting surface layer of the optoelectronic means 12, which may consist of a lithium niobate crystal or silicon crystal, is the vehicle for a measurement waveguide 17, a a reference waveguide 18 and a branch waveguide 19. The measurement waveguide 17 extends to an edge 20 at which point a laser 21 is positioned for radiating light into the measurement waveguide 17. The laser beam emerges from the measurement waveguide 17 at the opposite edge 22 and passes in the form of light beam 9 to the mirror 8 by which it is reflected back to the measurement waveguide 17.

The reference waveguide 18 extends between the edges 20 and 22. Located adjacent the edge 20 is a photodiode 23 for intercepting the light beam from the reference waveguide 18 and converting it into a corresponding electrical signal. Over a short distance, the reference waveguide 18 closely approaches the measurement waveguide 17 to form a coupling element 24.

One end portion of the branch waveguide 19 approaches the reference waveguide 18 to form a coupling element 25. The other end portion of the branch waveguide 19 joins with a photodiode 26 which intercepts the light from teh branch waveguide 19 and coverts it into a corresponding electric signal. Along a short stretch of the branch waveguide 19 on each side thereof are positioned electrodes 27 and 28 connected by lines 29 and 30 to a variable direct voltage source which is schematically indicated by plus and minus symbols. By adjusting the direct voltage at the electrodes 27 and 28, the phase position of the light at the photodiode 26, as opposed to the phase position of the light at the photodiode 23, is so changed that the phase of the voltage at the output of the photodiode 26 is shifted by 90° with respect to the phase at the photodiode 23.

If the previously described interferometer 14 is also displaced relative to the mirror 8 in the direction of the light beam 9, the path of the light rays in the beam 9 is changed, resulting in a change in the interference pattern in the reference waveguide 18 which is proportional to the movement of the optoelectronic means 12 and shown up at the photodiode 23 as a change in the output signal of the photodiode 23.

FIG. 4 shows the surface 15 having disposed thereon the focus position measuring system 16 of the optoelectronic means 12 (FIG. 2). The surface 15 is comprised in its entirety of a light conducting layer to enable the path of the rays to take a configuration as indicated in FIG. 4. A laser 31 is disposed at on side and radiates onto a reflecting surface or mirror 32 inclined at 45°. The light is deflected by the mirror 32 into fucussing grids 33 and 34 for focussing the light rays 10 onto the surface 11 to be measured by which they are reflected into the focussing grids 33 and 34 as indicated by the double arrows. The focussing grid 33 acts as a beam splitter and causes one half of each light beam to be focussed onto focussing point 35 and the other half onto focussing point 36, which are located exactly intermediate photodiodes 37 and 38, and photodiodes 39 and 40, respectively, provided the surface 11 is accurately with the focus of the light rays 10. The output signals of the photodiodes 37 to 40 are combined to form an output signal of the focus position measuring system 16 in a way not relevant to the present invention.

If the distance between the focus position measuring system 16 and the surface 11 being measured undergoes changes due to roughness or a change of the contour of the surface 11, then the focus position will likewise be changed and correspondingly also the output signal of the photodiodes 37 to 40 and thus of the entire focus measuring system 16.

Figure 5:
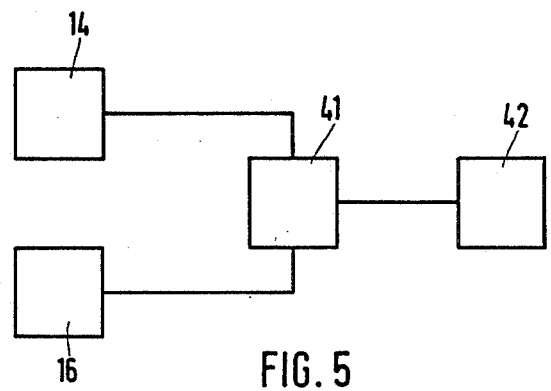
FIG. 5 is a block diagram of the electronic components of the device according to FIG. 1.

It will be apparent from the block diagram of FIG. 5 that the outputs of the interferometer 14 and the focus position measuring system 16 are connected to adding means 41 for adding up the output signals to produce a measuring signal total which is supplied to indicating-/display or recording means 42. Since the output signal of the interferometer 14 corresponds to the particular sliding displacement position of the measuring boy 1, that is, its absolute position, and the ouput signal of the focus position measuring system 16 corresponds to the distance of the measuring body 1 from the particular point that has been selected on the surface 11, the summation signal produced by the adder 41 corresponds to the sum of the lengths represented by the light beams 9 and 10 so that, independently of the position of the measuring body 1, a length measurement is arrived at which defines the absolute distance of the measuring point, that is, the point of incidence of the light beam 10 on the surface 11, relative to the mirror 8. It is now an easy matter to ensure, by slidingly moving or adjusting the measuring body 1 in the direction of the double arrow 3, that the focus position measuring system 16 will always remain within its narrow measuring range.

Nevertheless, the distance of any measuring point on the surface 11 is indicated absolutely, that is, relative to the mirror 8, with a high degree of accuracy and over great measuring distances.

Mechanical drive means effecting the slidable movement of the guide element 2 and thus of the measuring body 1 and the control of the latter in dependence of reaching or exceeding limit values of the measuring range of the focus position measuring system have not been illustrated in the drawings since such conventional devices are within the realm of one skilled in the art.

Figure 6:
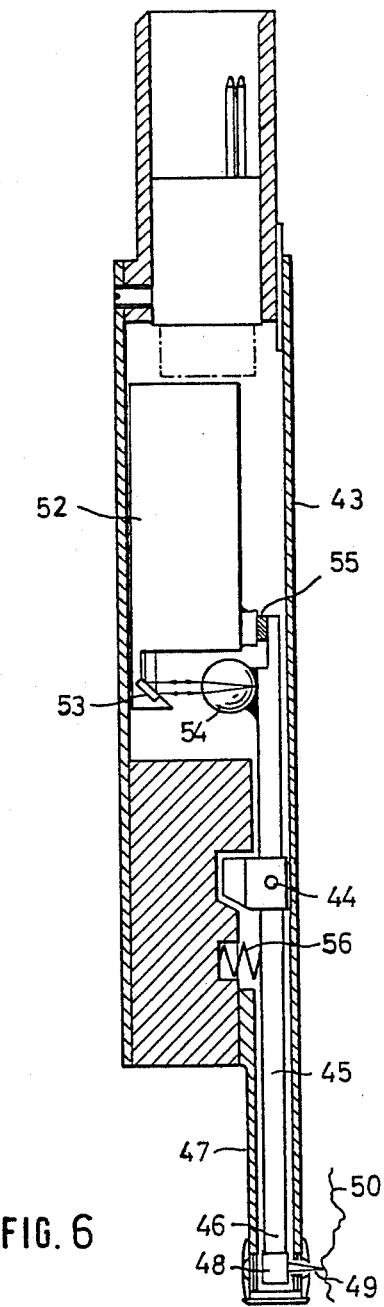
FIG. 6 illustrates diagrammatically another embodiment of the invention.

FIG. 6 illustrates diagrammatically another embodiment of the invention including a cylindrical housing 43 having a two-armed lever 45 disposed therein which is rotatable about an axis 44. One lever arm 46 extends into a tube shaped extension 47 of the housing 43 to support a small focus position measuring device 48 for focussing light indicated by lines 49 onto a contour 50 of the surface of a workpiece, the contour 50 being the object to be measured. The focus position measuring system 48 may be of the type as shown in FIG. 4, for example. The light from the focus position measuring system 48 passes through an aperture 51 in the tubular extension 47.

The pivotal position of the two-armed lever 45 is scanned by an interferometer 42 which may be of the type illustrated in FIG. 3. For reasons of miniaturizing the device, the interferometer is placed lengthwise inside the tube-shaped housing 43. The emerging light is deflected by a mirror 53 onto a small crystal sphere 54 attached to the lever 45 and corresponding to the mirror 8 of the interferometer of FIG. 3.

The end portion of the two-armed lever 45 adjacent the crystal sphere 54 is operatively engaged by electrodynamic drive means 55, merely schematically indicated, for adjusting the two-armed lever 45 against the biasing action of a spring 56. The electrodynamic drive unit 55 is controlled by the output signal of the focus position measuring system 48 in a manner such that the focus position measuring system 48 is always kept within its normal operating range.

What is claimed is:

1. Device for the contact-free measurement of a distance from a surface, particularly for scanning the contour of a surface of a workpiece along a given measuring path, comprising a measuring body enclosing optoelectronic means for transmitting light to the surface to be measured and converting the light reflected by such surface into an electric signal proportional to the distance from the surface, characterized in that the measuring body is slidably supported on a stand for movement in the direction of measurement, the optoelectronic means comprise a focus position measuring system and an optoelectronic position scanning unit for scanning the position of the measuring body relative to the stand, and includes an adder connected to indicating or recording means for adding the electric output signal of the focus position measuring system to the electric output signal of the position scanning means to produce a summation signal which corresponds to the distance of the measuring body from the surface being measured at any position of the measuring body on the stand.

2. Device according to claim 1, characterized in that the measuring body comprises a centrally-pivoted two-armed lever, the end of one arm carrying said focus position measuring system.

3. Device according to claim 1 which includes a servomotor to adjust the measuring body toward or away from the surface to be measured in order to decrease the measured value of the focus position measuring system when the latter exceeds a definitive value of its measuring range.

4. Device according to claim 1 characterized in that the measuring body is connected to oscillating drive means for moving the measuring body back and forth along the direction of measurement, and that switch means are provided between the adder and the indicating or recording unit, said switch means being controlled by the electric output signal of the focus position measuring system such that each time the output signal has reached a predetermined value, said switch means supplies the sum total signal formed by the adder to the display or recording unit.

5. Device according to claim 4 characterized in that the oscillating drive for the measuring body comprises a voice coil movable in a permanent magnetic field.

6. Device according to claim 1 characterized in that a positioning means is provided for adjusting the measuring body in the direction of measurement by defined increments, enabling a meander-like scanning of profiles which exceed the measuring range of said focus position measuring system.

7. Device according to claim 6 characterized in that a glass measuring rod having a high resolution path is provided for the unequivocal assignment of the meandering scanning lines.

8. Device according to claim 1 characterized in that the optoelectronic position scanning unit comprises an optical interferometer attached to the measuring body and includes a measurement waveguide one end of which is connected to a laser and the other end is connected to an optical device which reflects the light opposite to the direction of measurement onto a mirror secured to the supporting stand, said mirror reflecting the light beam back into the measurement waveguide, said interferometer further including a reference waveguide partially approaching the measurement waveguide to establish a coupled relationship, and connecting to a photodiode at one end and a mirror at the other end.

9. Device according to claim 1 characterized in that the focus position measuring system includes a laser, the light of which is focussed onto the surface being measured by means of a first focussing means followed by a second focussing means for focussing the reflected light on two adjacent photodiodes by which an electric output signal is produced proportional to the degree of focussing and thus to the distance of the measuring body from the surface being measured.

* * * * *